April 22, 1947.    J. M. HOFF    2,419,493
FARM LOADER
Filed June 20, 1945    4 Sheets-Sheet 4
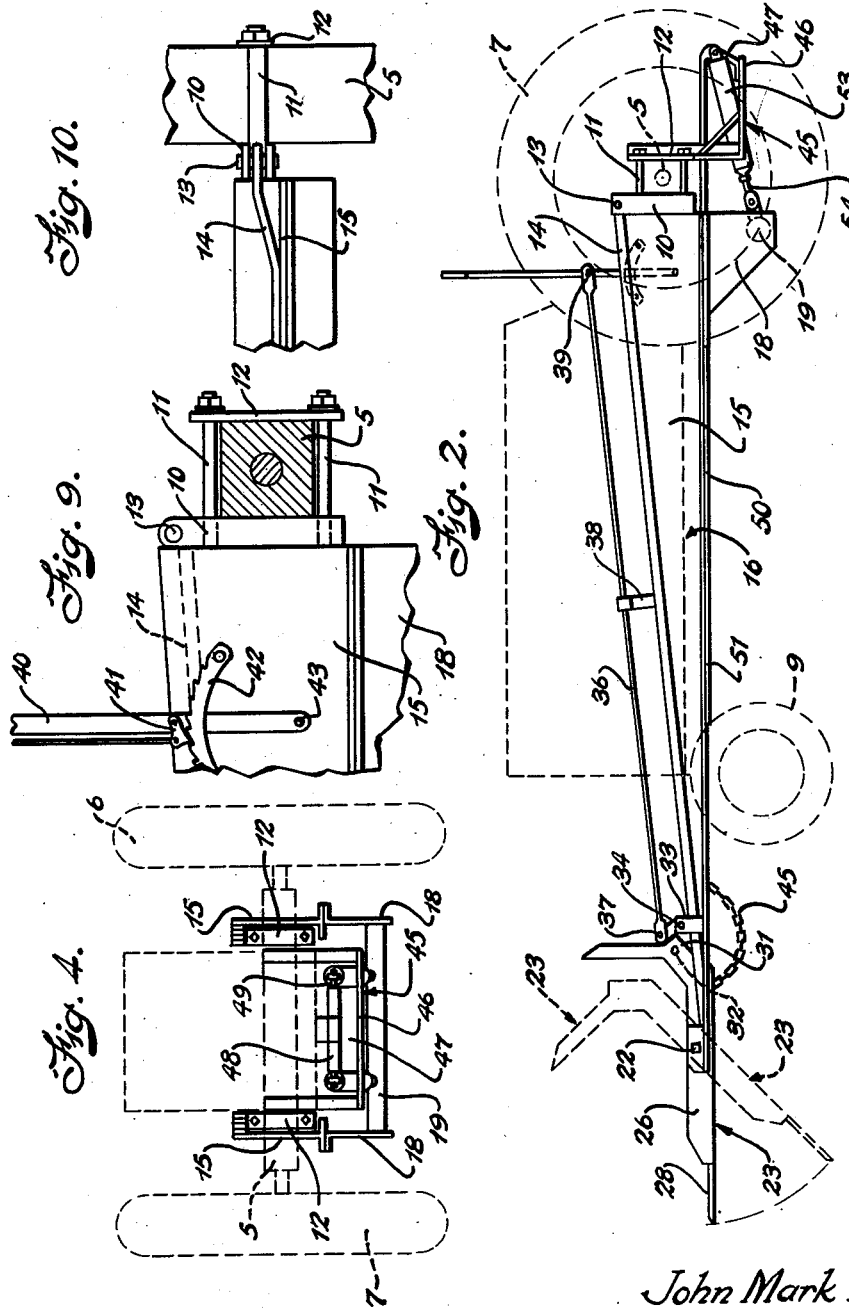
Inventor
John Mark Hoff.
By Clarence A. O'Brien
and Harvey B. Jacobson
Attorneys Patented Apr. 22, 1947

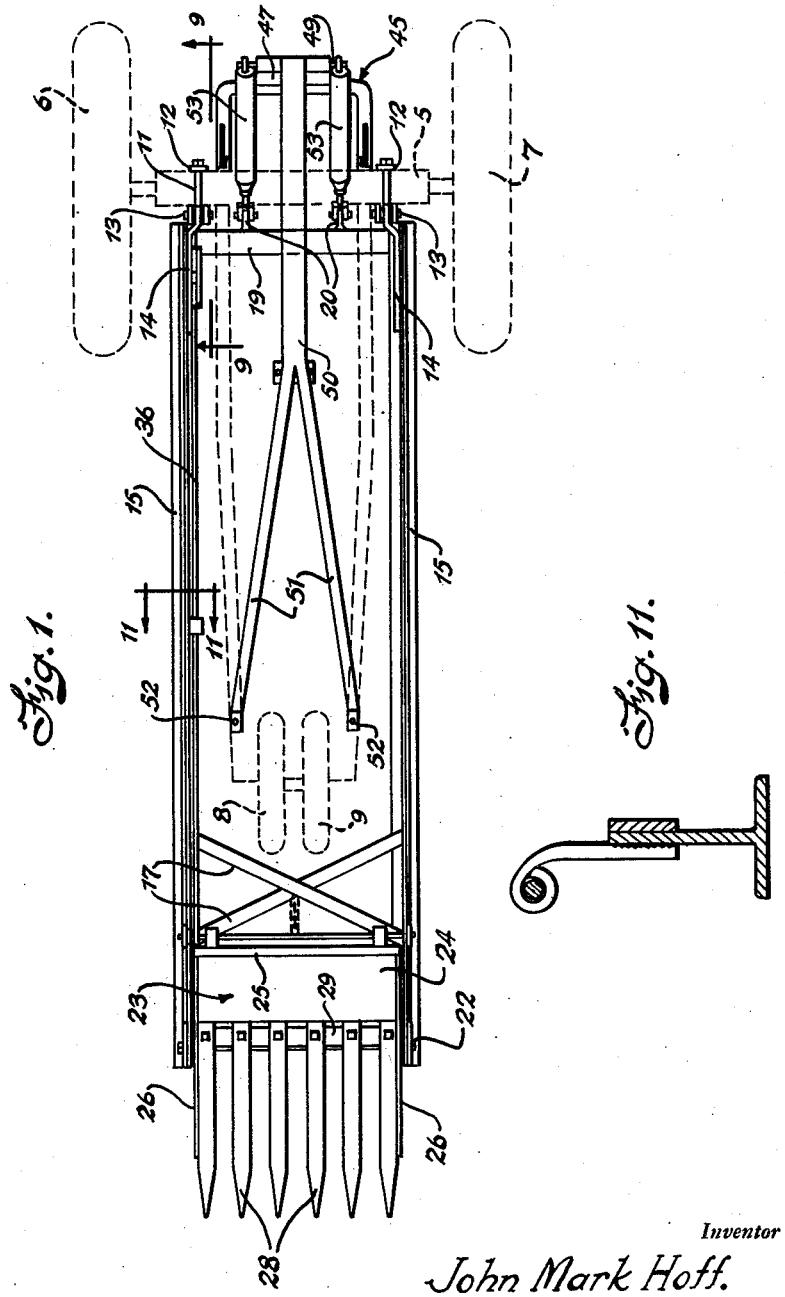

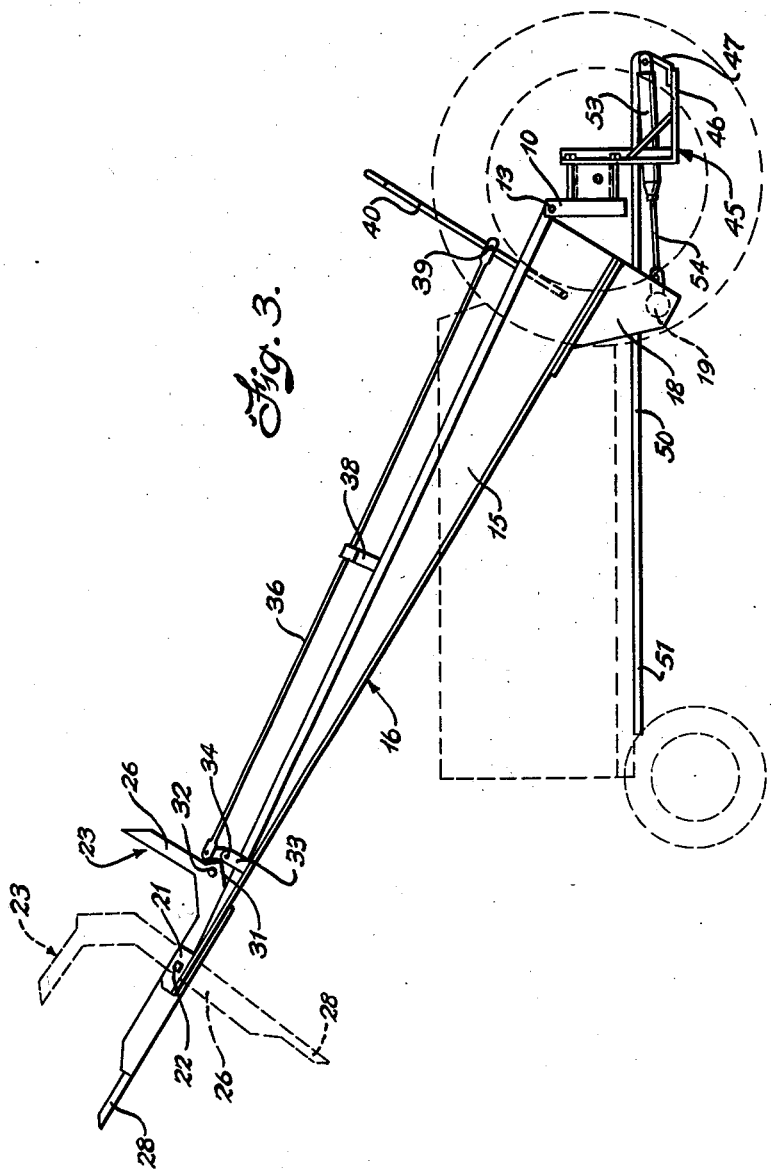

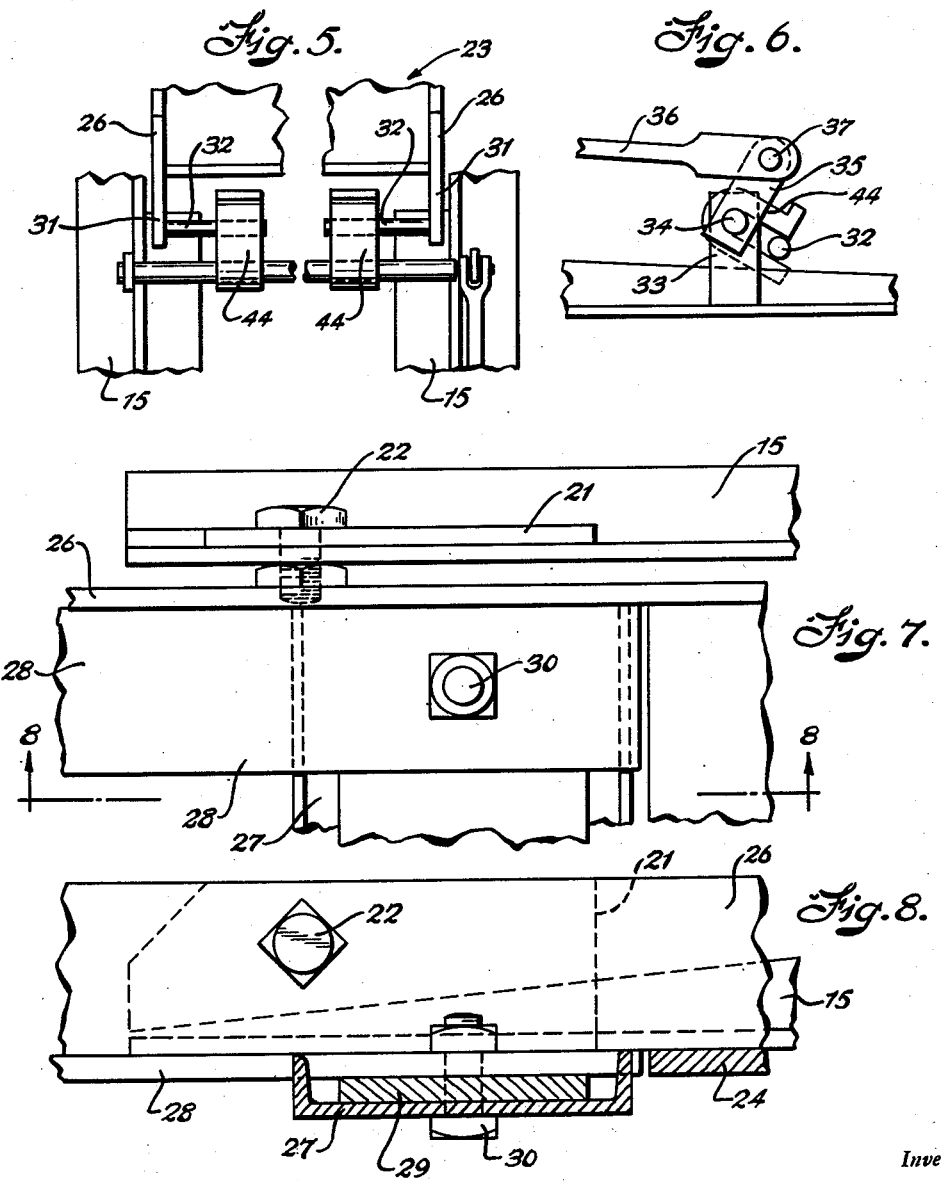

2,419,493

UNITED STATES PATENT OFFICE 2,419,493

FARM LOADER

John Mark Hoff, Idaho Falls, Idaho

Application June 20, 1945, Serial No. 600,431

2 Claims. (Cl. 214—140)

This invention relates to a loader, which is adapted to be mounted on a farm tractor and raised and lowered by means of hydraulic equipment, and one of its objects is to provide a loader of this type which includes a main cantilever frame having pivot bearing at its rear end and means on its forward end for releasing the loading fork or bucket.

Another object of the invention is the provision of a loader of this type with a lock for holding the loading fork on the cantilever frame against pivotal movement, and means for releasing the lock, which can be operated from the lower end of the cantilever frame, after the same has been tilted to elevated position, so that the loading fork can swing to a right angular relation to the main cantilever frame.

With the above and other objects, the invention comprises certain new and useful constructions, combinations and arrangements of parts, clearly described in the following specification, and fully illustrated in the accompanying drawings, in which:

Figure 1 is a top plan view of the loader, embodying this invention, the farm tractor being shown in dotted lines, Figure 2 is a side view of Figure 1, Figure 3 is a view similar to Figure 2 showing the loader in elevated position, Figure 4 is a rear end view of Figure 2, Figure 5 is a fragmentary plan view of the loader on an enlarged scale showing the fork and bucket latches in detail, Figure 6 is a side view of Figure 5, Figure 7 is a plan view on an enlarged scale of the forward end of one of the side bars showing the fork mounting in detail, Figure 8 is a sectional view taken on the line 8—8 of Figure 7, Figure 9 is an enlarged fragmentary sectional view taken on the line 9—9 of Figure 1 axle, Figure 10 is a plan view of Figure 9, and Figure 11 is an enlarged sectional view taken substantially on the line 11—11 of Figure 1.

Referring to the accompanying drawings, which illustrate the practical embodiment of the invention, 5 designates the rear axle of the farm tractor, having main rear ground wheels 6 and 7 mounted on the ends thereof. The forward end of the tractor is supported by the smaller ground wheels 8 and 9.

Against the forward side of the rear axle bearing bars 10 are bolted by means of the bolts 11 which extend through the clamp bars 12. To the upper ends of the bearing bars 10 are pivoted as at 13 the rear ends of the coupling bars 14, which are welded or otherwise fixed to side beams 15 of the main cantilever loading frame 16. These side beams are cut diagonally from a deep I-beam and are so arranged as to progressively decrease in depth toward their forward ends. Extending transversely between the beams 15 near their forward ends are diagonal braces 17 which are positioned far enough in advance of the pivots 13 as to avoid interference with the forward end of the tractor (see Figure 1). Attached to the under side of each beam 14 adjacent its rear end is a bracket 18 and extending transversely between the brackets 18 is a hoist bar 19 from the rear side of which project spaced ears 20 the use of which will hereinafter appear.

Secured adjacent the extreme forward ends of the vertical webs of the side beams 15 are upstanding brackets 21 which are pierced to receive bolts 22 the shank of each of which projects inwardly for a short distance to form oppositely disposed aligned trunnions upon which a bucket designated generally 23 is pivotally mounted. This bucket 23 comprises a bottom 24, a back 25 which extends perpendicular to the bottom and substantially L-shaped side walls 26 the longer arm of each of which is secured to the bottom and extends for considerable distance beyond the forward edge thereof while the shorter arm of each side wall is joined to the side edges of the perpendicular back 25. In this manner a shallow trough or bucket substantially L-shaped in section is formed. Secured to opposite side walls 26 slightly in advance of the bottom 24 of the bucket 23 is a channel 27 the flanges of which are provided at spaced intervals with notches in which the rearmost ends of a plurality of spaced tines 28 are seated. A filler bar 29 rests on the web of the channel 27 and together with the web is provided with spaced openings for the reception of bolts 30 by means of which the tines are firmly secured in the notches in the channels. By the engagement of the side edges of the tines rotation of the tines about their respective bolts 30 is precluded. Projecting rearwardly from opposite side walls 26 near the junction of the L-shaped legs are ears 31 to the inner faces of which, are welded latch pins 32 (Figure 5) by which the bucket is held against swinging movement about the trunnions 22 by the trip mechanism to be more fully hereinafter described.

Mounted for rotary motion in bearings 33 which extend upwardly from the side beams 15 immediately to the rear of the bucket 23 is a shaft 34 carrying at one end a lever arm 35 to which a link 36 is pivotally attached as at 37. This link 36 extends rearwardly above one of the side beams 15 through a bracket 38 and its rear end is pivoted as at 39 to a hand lever 40. This hand lever carries a hand operated latch dog 41 (Figure 9) which cooperates with a notched quadrant 42 in holding the lever in various positions about its pivot, it being understood that the lever is pivoted as at 43 to one of the side beams 15 near its rear end. Mounted on the shaft 34 in a position to receive the latch pins 32 are substantially U-shaped keepers 44. It will thus be seen that the bucket 23 is held against swinging movement about the trunnions 30 when the latch pins 32 and keepers 44 are in the position shown in Figure 6, but that when the hand lever 40 is moved to rock the shaft 34 in a counterclockwise direction as viewed in Figure 6, the latch pins will be elevated to give an initial tilt to the bucket 23 so as to start it in a direction to discharge its contents. As the bucket movement continues the latch pins 32 swing clear of the keepers 44 so that no hindrance to the discharge of the contents of the bucket 23 is experienced. In order to limit the swinging movement of the bucket 23 about its trunnions 22 a flexible member such as a chain 45 is connected to the rear end of the bucket 23 near its bottom and to the cross bars 17 at their point of intersection.

To the rear axle 5 of the tractor is attached a conventional draw-bar designated generally 45 to the upper face of the rearmost bight portion 46 of which is attached a bracket 47. Carried at the upper end of the bracket 47 are spaced barrels 48 in which a transversely extending shaft 49 is secured. A horizontally extending torque-bar 50 is attached to this shaft between the barrels 48 and extends forwardly therefrom beneath the tractor. The forward end of the torque-bar is divided into two separate arms 51 which are attached at 52 adjacent their extreme forward ends to the under side of the tractor frame near its front end. Pivotally attached adjacent opposite ends of the shaft 49 are hydraulic cylinders 53 in which hydraulically controlled pistons carrying piston rods 54 operate. The forward outer ends of these piston rods are pivoted to the ears 20 on the hoist bar 19. It will thus be seen that when fluid under pressure is admitted to the cylinders behind the pistons the piston rods 54 will be moved outwardly and will cause the frame 16 to swing about the pivots 13, thus elevating its forward end as shown in Figure 3. Having lifted the forward end to the desired height the load carried in the bucket 23 may be dumped by moving the lever 40 to cause the keepers 44 to move to a position to allow the latch pins 32 to be withdrawn therefrom.

When it is desired to return the bucket 23 to load retaining position the frame 16 is lowered until the tines contact the ground. Such contact will upon continued downward movement of the frame cause the bucket to swing on its trunnions 22 back to original load holding position in which it may be latched by moving the keepers back to original position.

It is to be understood that any suitable source of fluid under pressure (not shown) may be connected to the cylinders 53 through appropriate valves to regulate the movements of the pistons and piston rods 54.

While in the foregoing there has been shown and described the preferred embodiment of this invention it is to be understood that minor changes in the details of construction, combination and arrangement of parts may be resorted to without departing from the spirit and scope of the invention as claimed.

Having described my invention, I claim as new:

1. A loader comprising a pair of spaced parallel lift arms pivotally connected to the rear axle of a farm tractor and extending forwardly beyond the forward end of said tractor, a dump bucket pivotally supported between the forward ends of the arms in advance of the forward end of the tractor, a latch operable from the rear end of the tractor releasably to hold the bucket in load sustaining position, a bracket projecting downwardly from each lift arm adjacent its rear end, a hoist bar extending between said brackets adjacent their lower ends, and hydraulic means connected to the hoist bar and to the draw bar of the tractor whereby when the hydraulic means is energized, the lift arms will be moved about their pivots.

2. The combination with a pair of lift arms pivotally supported astride a farm tractor and means to elevate the forward ends of the lift arms, of a dump bucket pivoted between the forward ends of the lift arms, a rock shaft extending between the lift arms adjacent the rear end of the bucket, a U-shaped latch carried adjacent opposite ends of the rock shaft, a pair of opposed studs projecting inwardly from opposite sides of the rear end of the dump bucket and means operable from a position near the pivotal connection of the lift arms to rock the rock shaft and move the latches into and out of stud receiving position whereby to control the release of the dump bucket from load sustaining position.

JOHN MARK HOFF.

REFERENCES CITED

The following references are of record in the file of this patent:

UNITED STATES PATENTS

| Number | Name | Date |
|---|---|---|
| 2,268,689 | Andrus | Jan. 6, 1942 |
| 2,348,899 | Guignard et al. | May 16, 1944 |
| 2,363,986 | Mott | Nov. 28, 1944 |
| 2,389,928 | Pasker | Nov. 27, 1945 |
| 2,304,672 | Bell | Dec. 8, 1942 |
| 2,296,827 | Anderson et al. | Sept. 29, 1942 |